US009921553B2

(12) United States Patent
Okabayashi

(10) Patent No.: US 9,921,553 B2
(45) Date of Patent: Mar. 20, 2018

(54) AUDIO SIGNAL PROCESSING APPARATUS FOR PARAMETER ASSIGNMENT

(71) Applicant: Yamaha Corporation, Hamamatsu-shi, Shizuoka-ken (JP)

(72) Inventor: Masaaki Okabayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 936 days.

(21) Appl. No.: 13/899,461

(22) Filed: May 21, 2013

(65) Prior Publication Data
US 2013/0310954 A1 Nov. 21, 2013

(30) Foreign Application Priority Data

May 21, 2012 (JP) .................................. 2012-115208

(51) Int. Cl.
*G05B 11/01* (2006.01)
*G05B 19/10* (2006.01)

(52) U.S. Cl.
CPC ............ *G05B 11/01* (2013.01); *G05B 19/106* (2013.01); *G05B 2219/23052* (2013.01)

(58) Field of Classification Search
CPC ...... G05B 23/0216; G05B 2219/32128; G05B 2219/23258; G05B 2219/13144; G05B 2219/23067; G06F 8/38; G06F 3/0484; G10H 1/0008; G10H 1/183; G10H 1/186
See application file for complete search history.

(56) References Cited

U.S. PATENT DOCUMENTS

| | | | | |
|---|---|---|---|---|
| 4,224,856 A * | 9/1980 | Ando | .................. | G10H 7/06 84/615 |
| 5,768,632 A * | 6/1998 | Husted | .............. | G05B 19/0423 700/31 |
| 7,499,558 B2 * | 3/2009 | Holton | ................... | H04H 60/04 369/4 |
| 8,050,427 B2 * | 11/2011 | Terada | .................. | H04H 60/04 345/440 |
| 8,073,159 B2 * | 12/2011 | Ando | ..................... | H04H 60/04 369/4 |
| 8,219,913 B2 * | 7/2012 | Terada | ................ | G06F 3/04847 715/722 |
| 8,674,942 B2 * | 3/2014 | Fujita | ..................... | H04H 60/04 345/172 |
| 8,687,825 B2 * | 4/2014 | Okabayashi | .......... | H04H 60/04 369/4 |

(Continued)

FOREIGN PATENT DOCUMENTS

JP 03-266893 A 11/1991
JP 2008-042446 A 2/2008

*Primary Examiner* — Darrin Dunn
(74) *Attorney, Agent, or Firm* — Morrison & Foerster LLP

(57) ABSTRACT

A specification of one of a plurality of controls is accepted, a specification of a plurality of items is accepted with respect to parameters, and among the plurality of controls, a plurality of controls to which parameter items are to be assigned are determined with reference to the control for which the specification is accepted. To each of the determined plurality of controls, one of the plurality of items for which the specification is accepted is assigned, and each of the plurality of controls is made to function as a control for operating the set value of the item assigned to this control.

9 Claims, 8 Drawing Sheets

(56) References Cited

U.S. PATENT DOCUMENTS

| | | | |
|---|---|---|---|
| 8,697,976 B2* | 4/2014 | Maruyama | G10H 1/0091 |
| | | | 84/615 |
| 9,048,961 B2* | 6/2015 | Fujita | H04H 60/04 |
| 2004/0001109 A1* | 1/2004 | Blancett | G06F 3/0482 |
| | | | 715/843 |
| 2005/0055117 A1* | 3/2005 | Holton | H04H 60/04 |
| | | | 700/94 |
| 2006/0045292 A1* | 3/2006 | Ando | H04H 60/04 |
| | | | 381/119 |
| 2011/0058691 A1* | 3/2011 | Okabayashi | H04H 60/04 |
| | | | 381/119 |
| 2011/0075864 A1* | 3/2011 | Hagiwara | H04H 60/04 |
| | | | 381/119 |
| 2011/0130200 A1* | 6/2011 | Terada | G06F 3/04847 |
| | | | 463/31 |
| 2012/0023406 A1* | 1/2012 | Fujita | H04H 60/04 |
| | | | 715/727 |
| 2012/0027230 A1* | 2/2012 | Okabayashi | H04L 67/125 |
| | | | 381/119 |

* cited by examiner

{Fig. 1}
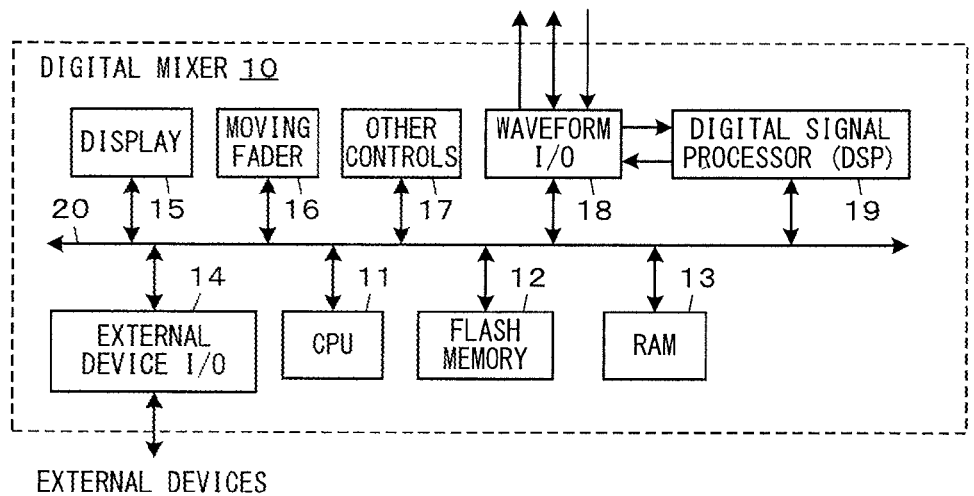
{Fig. 2}
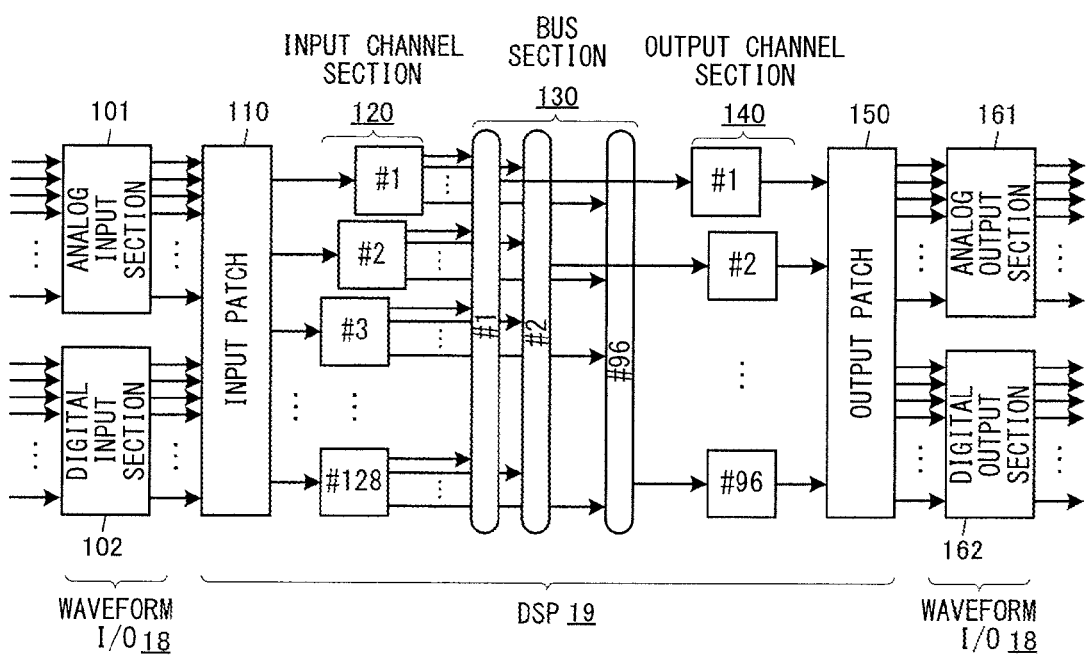

{Fig. 3}
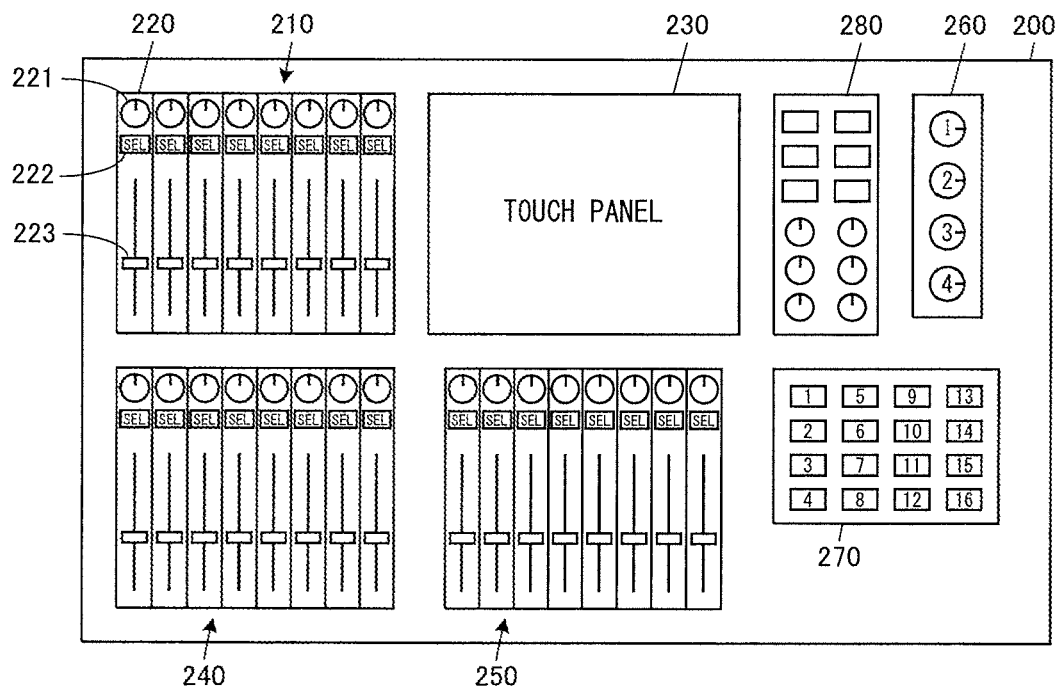
{Fig. 4}
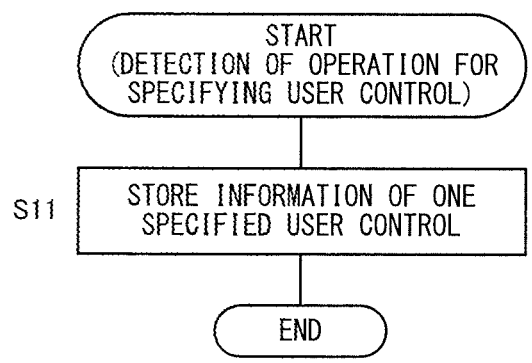

{Fig. 5}
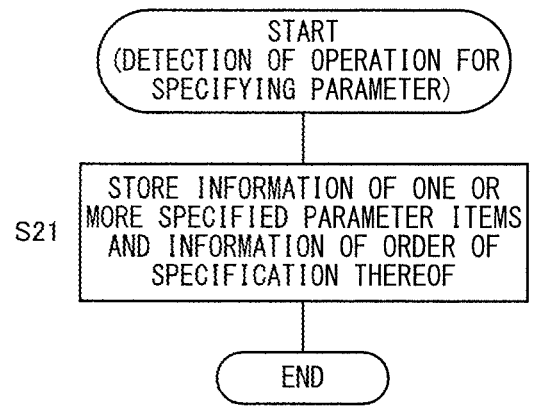
{Fig. 6}
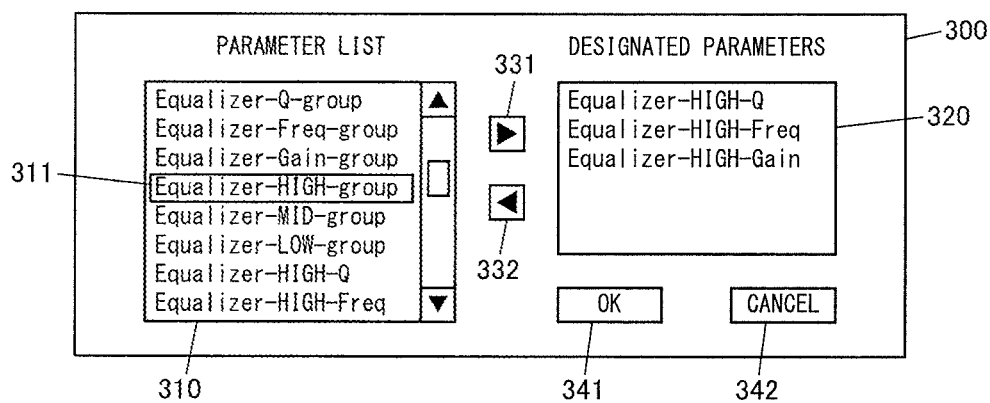

{Fig. 7}

ASSINGNMENT CANDIDATE
PARAMETER TABLE

| PARAMETER ID | NAME |
|---|---|
| ⋮ | ⋮ |
| 00121 | Equalizer-HIGH-Q |
| 00122 | Equalizer-HIGH-Freq |
| 00123 | Equalizer-HIGH-Gain |
| 00124 | Equalizer-MID-Q |
| 00125 | Equalizer-MID-Freq |
| 00126 | Equalizer-MID-Gain |
| 00127 | Equalizer-LOW-Q |
| 00128 | Equalizer-LOW-Freq |
| 00129 | Equalizer-LOW-Gain |
| ⋮ | ⋮ |

{Fig. 8}

PARAMETER GROUP TABLE

| GROUP ID | NAME | IDs OF PARAMETERS IN GROUP |
|---|---|---|
| ⋮ | ⋮ | ⋮ |
| 010 | Equalizer-Q-Group | 00121, 00124, 00127 |
| 011 | Equalizer-Freq-Group | 00122, 00125, 00128 |
| 012 | Equalizer-Gain-Group | 00123, 00126, 00129 |
| 013 | Equalizer-HIGH-Group | 00121, 00122, 00123 |
| 014 | Equalizer-MID-Group | 00124, 00125, 00126 |
| 015 | Equalizer-LOW-Group | 00127, 00128, 00129 |
| ⋮ | ⋮ | ⋮ |

{Fig. 9}
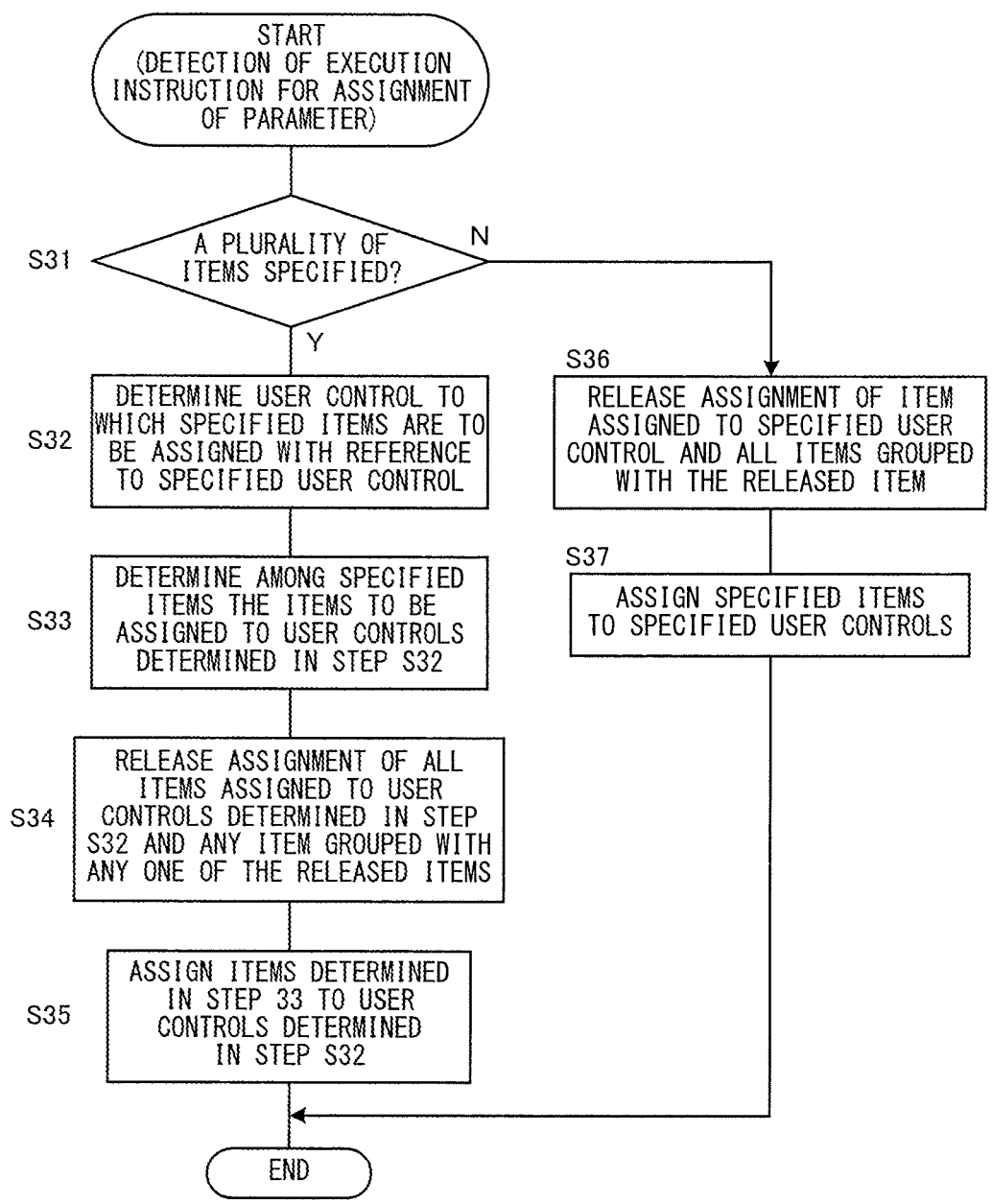

{Fig. 10}
CONTROL TABLE
| CONTROL ID | ASSIGNED GROUP ID | ASSIGNED PARAMETER ID |
|---|---|---|
| 1 | 999 | 00121 |
| 2 | 013 | 00121 |
| 3 | 013 | 00122 |
| 4 | 013 | 00123 |
{Fig. 11}
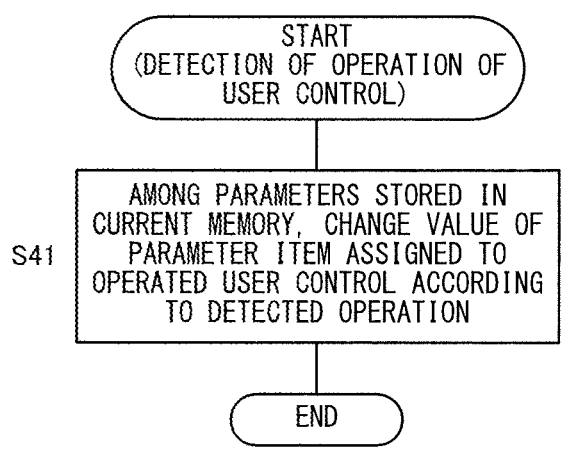

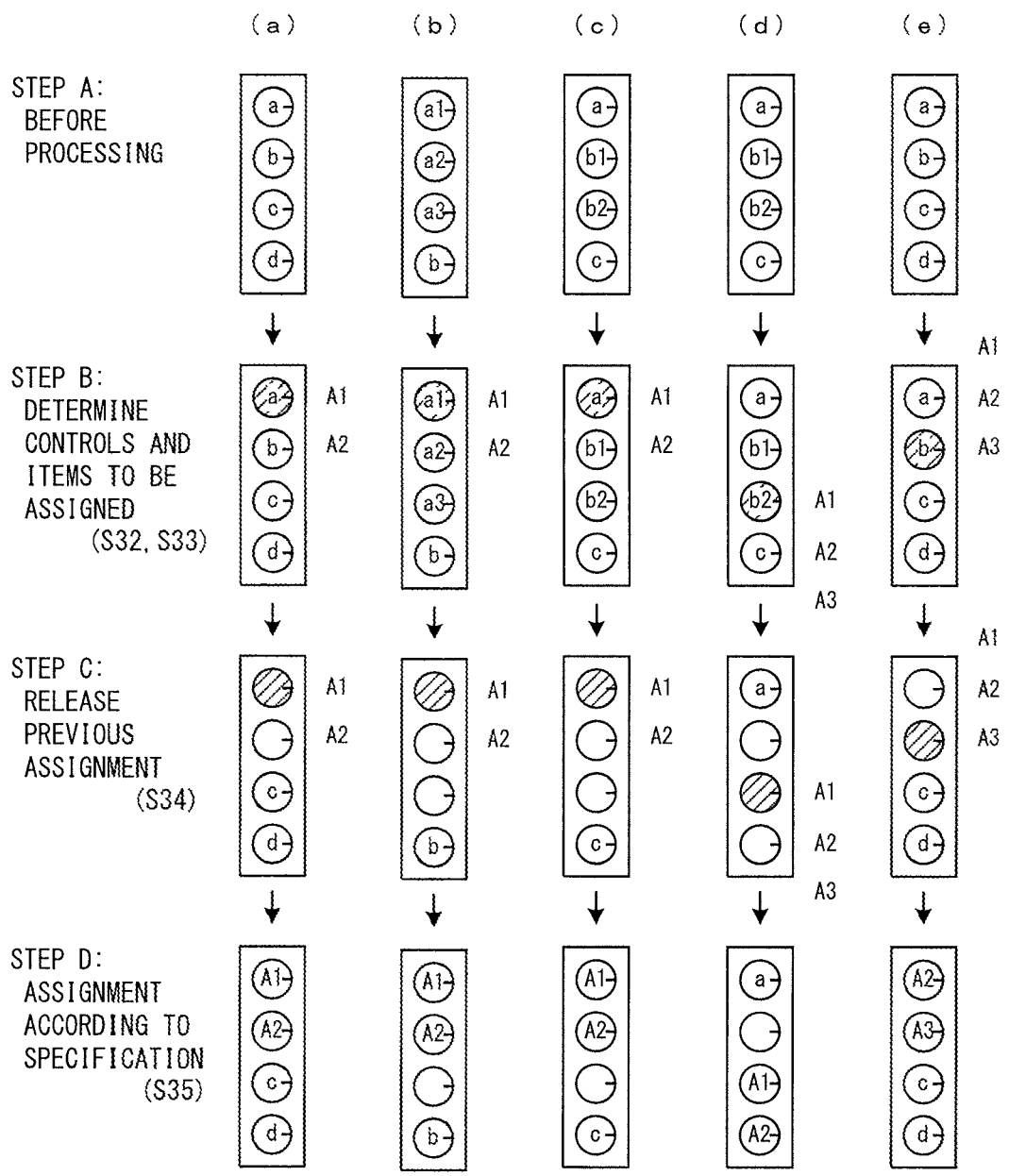
{Fig. 12}

{Fig. 13}
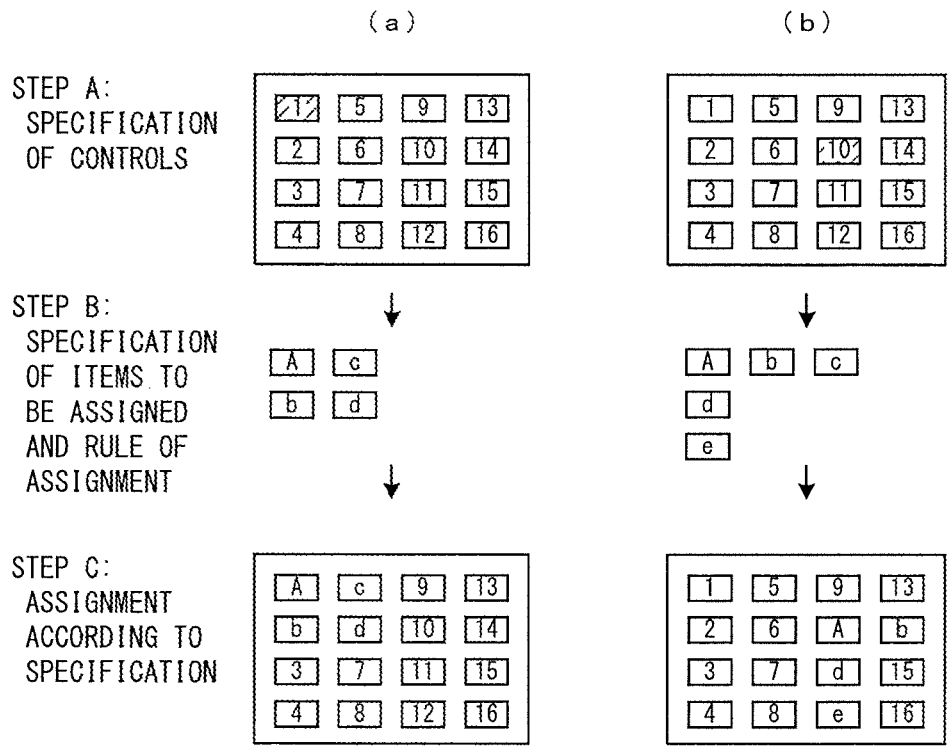
{Fig. 14}
ASSINGNMENT CANDIDATE
PARAMETER TABLE (MODIFICATION)
| PARAMETER ID | NAME |
|---|---|
| ⋮ | ⋮ |
| 00121 | Equalizer-HIGH-Q |
| 00122 | Equalizer-HIGH-Freq |
| 00123 | Equalizer-HIGH-Gain |
| 00124 | Equalizer-MID-Q |
| 00125 | Equalizer-MID-Freq |
| 00126 | Equalizer-MID-Gain |
| ⋮ | ⋮ |
| 10010 | Equalizer-Q-Group |
| 10011 | Equalizer-Freq-Group |
| 10012 | Equalizer-Gain-Group |
| ⋮ | ⋮ |

AUDIO SIGNAL PROCESSING APPARATUS FOR PARAMETER ASSIGNMENT

TECHNICAL FIELD

The invention relates to a controller having a function to edit values of a plurality of parameters, and to a program enabling a computer to function as such a controller.

BACKGROUND ART

It has been conventionally practiced to enable a user to edit values of a plurality of parameters by using a plurality of controls in a wide range of electronic apparatuses. In this case, when the number of items of the parameters is large, it is not possible to provide controls corresponding to all of them, and thus there have been various proposals regarding setting of the correspondence between controls and parameters.

For example, PTL1 describes that user-defined keys are provided in a mixer, and each user-defined key is assigned a desired parameter item according to the user's operation and is enabled to function as a control for editing the value of the assigned item.

PTL2 describes that in a musical sound control parameter setting apparatus, at the position corresponding to each of a plurality of controls on a display screen, parameter items which are editable with the controls are displayed, and the items editable by operating the controls can be switched in response to switching of the screen.

CITATION LIST

Patent Literature

{PTL1} JP 2008-42446 A
{PTL2} JP H3 (1991)-266893 A

SUMMARY OF INVENTION

Technical Problem

However, in the technology described in PTL1, there is a problem that the assigning operation is laborious because the user has to assign a parameter item to each of plural user-defined keys one by one.

In the technology described in PTL2, parameter items can be assigned at once to a plurality of controls, but the combination of items to be assigned is limited to combinations for which screen data are prepared in advance. It cannot therefore be said that the types of items which can be assigned to controls and the flexibility of assignment are sufficient.

Note that such a problem occurs similarly in an attempt to edit values of parameters for other than musical sound.

The invention is made in view of such a background, and has an object to enable assigning, by simple operation with a high degree of freedom, a plurality of controls parameter items to be operated with the controls.

Solution to Problem

To attain the above object, a controller of the invention includes: a plurality of controls; a first accepting device that accepts specification of one of the plurality of controls; a second accepting device that accepts specification of a plurality of parameter items; a determining device that determines controls, among the plurality of controls, to which the specified parameter items are to be assigned with reference to the specified control; an assigning device that assigns each of the controls determined by the determining device one of the specified parameter items; and a device that controls each of the plurality of controls to function as a control for controlling value of a parameter item assigned to the control according to the assignment by the assigning device.

It is also conceivable to realize the invention as a system, a method, a program, a storage medium, or any other forms, other than the above described device.

The above and other objects, features and advantages of the invention will be apparent from the following detailed description which is to be read in conjunction with the accompanying drawings.

Advantageous Effects of Invention

A control apparatus of the invention as above enables assigning, by simple operation with a high degree of freedom, a plurality of controls parameter items to be operated with the controls.

Further, a program of the invention can achieve similar effects by a computer reading and executing the program.

BRIEF DESCRIPTION OF DRAWINGS

FIG. 1 is a diagram illustrating a hardware structure of a digital mixer, which is an embodiment of a controller of the invention.

FIG. 2 is a diagram illustrating, in more detail, a configuration of signal processing executed in a DSP illustrated in FIG. 1.

FIG. 3 is a diagram illustrating a structure of an operating panel of a digital mixer illustrated in FIG. 1.

FIG. 4 is a flowchart of processing executed by a CPU of the digital mixer upon detection of an operation for specifying a user control.

FIG. 5 is a flowchart of processing executed by the same upon detection of an operation for specifying one or more parameters.

FIG. 6 is a diagram illustrating an example of a screen for accepting a specification of a parameter item to be assigned to a user control.

FIG. 7 is a diagram illustrating an example of an assignment candidate parameter table.

FIG. 8 is a diagram illustrating an example of a parameter group table.

FIG. 9 is a flowchart of processing executed by a CPU of the digital mixer upon detection of an execution instruction for assignment of one or more parameters.

FIG. 10 is a diagram illustrating an example of a control table.

FIG. 11 is a flowchart of processing executed by a CPU of the digital mixer upon detection of an operation of a user control.

FIG. 12 is a diagram illustrating specific examples of assignment of parameter items to user controls.

FIG. 13 is a diagram illustrating other specific examples of assignment of parameter items to user controls.

FIG. 14 is a diagram illustrating another example of the assignment candidate parameter table.

DESCRIPTION OF EMBODIMENTS

Hereinafter, embodiments for carrying out the invention will be described specifically based on the drawings.

First, FIG. 1 illustrates a hardware structure of a digital mixer, which is an embodiment of a control apparatus of the invention.

As illustrated in FIG. 1, a digital mixer 10 includes a CPU 11, a flash memory 12, a RAM 13, an external device input/output module (I/O) 14, a display 15, a moving fader 16, other controls 17, a waveform I/O 18, and a digital signal processor (DSP) 19, which are connected through a system bus 20.

The CPU 11 is a control unit for entirely controlling the operation of this digital mixer 10, and performs, by executing a necessary program stored in the flash memory 12, processing to control input/output of an audio signal in the waveform I/O 18 and display on the display 15, detecting an operation of the moving fader 16 and the other controls 17 and controlling setting/changing of parameter values and operation of the respective modules according to the operation, or the like.

The flash memory 12 is a rewritable, non-volatile storage which stores a control program executed by the CPU 11, and the like.

The RAM 13 is storage for storing data which are stored temporarily, and for being used as a work memory for the CPU 11.

The external device I/O 14 is an interface for connecting and performing input to/output from various external devices, and an interface for connecting, for example, an external display, mouse, keyboard for inputting characters, operating panel, and the like is prepared. Even when the display and controls of the main body are structured quite simply, it is conceivable to allow performing setting/changing of parameters and operation instruction by utilizing these external devices.

The display 15 is a display unit for displaying various information according to control by the CPU 11, and can be made up of, for example, a liquid crystal panel (LCD) and/or light emitting diodes (LED).

The moving fader 16 is a control for accepting an operation of a parameter of the fader, which will be described later, includes a drive unit, and can automatically move a switch to an arbitrary position under control of the CPU 11.

The other controls 17 are controls other than the moving fader 16 for accepting an operation on the digital mixer 10, and can be made up of various keys, buttons, a rotary encoder, a slider, a touch panel laminated on the LCD as the display 15, and so on. Further, although details will be described later, the other controls 17 also include a user control which can be used as a control to which a user assigns a parameter (or assigns a parameter item) for operating the value of this parameter (set value of this item).

Note that an "item" of parameters, or a parameter item, refers to a smallest unit of parameters whose value can be individually operated by a user.

The waveform I/O 18 is an interface for accepting an audio signal input to be processed in the DSP 19 and outputting an audio signal after being processed.

The DSP 19 is a signal processor which includes a signal processing circuit, performs various signal processing, such as mixing, equalizing, and/or the like, on an audio signal inputted from the waveform I/O 18 according to values of various processing parameters set as current data to be reflected to the signal processing, and outputs the processed audio signal to the waveform I/O 18. The current data including values of parameters used for this processing are stored in a current memory provided in the RAM 13 or in a memory included in the DSP 19 itself, and the user can confirm and change values of the current data by using the display 15, the moving fader 16, and the other controls 17.

Next, FIG. 2 illustrates, in more detail, a configuration of signal processing executed in the DSP 19 illustrated in FIG. 1.

As illustrated in this diagram, the signal processing in the DSP 19 has an input patch 110, an input channel section 120, a bus section 130, an output channel section 140, and an output patch 150. Further, an analog input section 101, a digital input section 102, an analog output section 161, and a digital output section 162 illustrated in FIG. 2 correspond to the function of the waveform I/O 18.

In the DSP 19, each of input ports of the analog input section 101 and the digital input section 102 prepared corresponding to input terminals in the waveform I/O 18 can be patched (wired) by the input patch 110 to one of input channels of the input channel section 120, which are 128 channels from #1 to #128.

On each input channel, after signal processing by an attenuator, an equalizer, or the like is performed on a signal inputted from the patched input port, a signal after being processed is transmitted to an arbitrary bus among mixing buses of the bus section 130, which are 96 buses from #1 to #96. Regarding this transmission, it is possible to perform turning on and off and level adjustment per each combination of an input channel and a bus.

On each mixing bus, signals inputted from the respective input channels are mixed, and the mixed signal is outputted to one of 96 output channels #1 to #96 of the output channel section 140, which are provided corresponding to the respective mixing buses. Then, in each output channel, signal processing through an equalizer, a compressor, and/or the like is performed on the signal inputted from the corresponding mixing bus.

The output patch 150 then patches each output channel to one of output ports of the analog output module 161 and the digital output module 162 prepared corresponding to the output terminals in the waveform I/O 18, and supplies the signal after being processed through the output channel to the output port to which it is patched, and the signal is outputted therefrom.

Note that the signal processing of these sections provided in the DSP 19 is controlled based on the respective currently set values (current data) of the parameters stored in the current memory. The function of each unit may be realized either by software or hardware.

Next, FIG. 3 illustrates a schematic structure of an operating panel of the digital mixer 10.

As illustrated in FIG. 3, the operating panel 200 of the digital mixer 10 has a first channel strip section 210, a touch panel 230, a second channel strip section 240, a third channel strip section 250, a user knob section 260, a user key section 270, and an other-control section 280.

The first to third channel strip sections 210, 240, 250 each have eight channel strips 220. Each channel strip 220 is assigned an input channel or an output channel, and each control included in this channel strip 220 can be used as a control for performing operations related to the assigned channel.

Each channel strip 220 has a rotary encoder 221, a selection key 222, and a fader 223. Among them, the rotary encoder 221 is a control which is assigned a parameter included in a channel and is used for operating value of the assigned parameter. The selection key 222 is a control for selecting a channel. The fader 223 is a control for adjusting value of a fader parameter of the channel.

Next, the touch panel 230 is a display and an operating device displaying a GUI (graphical user interface) screen for accepting various operations including setting of value of a parameter, assigning a parameter to a control, and the like, and displaying the operating state of the digital mixer 10 or the currently set values of parameters.

The user knob section 260 is a section having a plurality of knobs as controls. Each of these knobs can be arbitrarily assigned a parameter by the user and used as a control for operating value of the parameter. FIG. 3 illustrates an example in which four, first to fourth knobs are provided.

The user key section 270 is a section having a plurality of keys as controls. Each of these keys can be arbitrarily assigned a parameter item by the user and can be used as a control for operating value of the parameter item. FIG. 3 illustrates an example in which 16, first to sixteenth keys are provided in a 4×4 two-dimensional array.

The other-control section 280 is a section in which controls having various functions other than those which have been described are disposed.

One of characteristic points of the digital mixer 10 as above is the method for assigning parameter items to controls (these will be generally referred to as "user controls") of the user knob unit 260 and the user key unit 270. This point will be described in detail below.

The digital mixer 10 accepts specifications of a parameter item desired to be assigned to a user control and a user control as a target of the assignment from the user, and assigns the specified item to the specified user control when an execution instruction of assignment is detected in a state that these specifications are accepted.

At this time, as the parameter item to be assigned, it is also possible to specify a plurality of items at once. When a plurality of items are specified at once, the digital mixer 10 automatically decides a plurality of user controls as the targets of assignment of parameter items with reference to one user control specified as the target of assignment, and assigns the plurality of specified items to the decided respective user controls.

Now, FIG. 4 illustrates a flowchart of processing executed by the CPU 11 of the digital mixer 10 upon detection of an operation for specifying a user control.

The CPU 11 of the digital mixer 10 starts the processing illustrated in the flowchart of FIG. 4 upon detection of an operation for specifying one of user controls as the target of assigning a parameter. Note that this specifying operation can be accepted through an arbitrary method such as an operation on a list screen of user controls displayed on the touch panel 230, an operation on a control of the other-control section 280, an operation on a user control itself, or the like. In this acceptance, the CPU 11 functions as a first accepting device.

In the processing of FIG. 4, the CPU 11 then stores information of the one specified user control in an appropriate memory (S11) and ends the processing. This information to be stored is, for example, the ID of the relevant control.

Next, FIG. 5 illustrates a flowchart of processing executed by the CPU 11 of the digital mixer 10 upon detection of an operation for specifying one or more parameters.

The CPU 11 of the digital mixer 10 starts the processing illustrated in the flowchart of FIG. 5 upon detection of an operation for specifying one or more items as a parameter item to be assigned to a user control. Note that this specifying operation can be accepted through an arbitrary method such as an operation on a screen displayed on the touch panel 230, an operation on a control of the other-control section 280, or the like. The specification of items can be performed by specifying a group including a plurality of items. In this acceptance, the CPU 11 functions as a second accepting device.

In the processing of FIG. 5, the CPU 11 then stores information of the one or more specified items and information of the order of specification thereof in an appropriate memory (S21) and ends the processing. The information of the items to be stored is, for example, the ID of the relevant item(s).

Next, FIG. 6 illustrates an example of a screen for accepting a specification of a parameter item to be assigned to a user control.

A parameter specification screen 300 illustrated in FIG. 6 is a GUI to be displayed on the touch panel 230, and includes a candidate display section 310, a specified parameter display section 320, a specify button 331, a release button 332, an OK button 341, and a cancel button 342.

Among them, the candidate display section 310 is a section displaying a candidate list of parameter items or groups of parameter items to be assigned to user controls. In the example of FIG. 6, a candidate having "group" at the end is a group, and any other candidate is an independent item. Thus, groups and independent items are mixed in the list of the example of FIG. 6, but it may be structured to display only groups or independent items, or allow selecting what to be displayed.

In either case, when one of the candidates is selected in the candidate display section 310 and the specify button 331 is operated, this candidate is specified as a parameter item to be assigned to a user control. This specification can be performed for an arbitrary number of items or groups. A cursor 311 indicates the selected item or group in the candidate display section 310.

The specified parameter display section 320 is a section for displaying the list of items specified by operating the specify button 331. When a group is specified, the name of this group may be displayed, but in the example of FIG. 6, the names of individual items included in the group are displayed.

Note that by selecting one of the items in the specified parameter display section 320 and operating the release button 332, the specification of this item can be released.

The OK button 341 is a button for determining the specification of an item or items at the time it is operated. When it is operated, the CPU 11 starts the processing of FIG. 5. The cancel button 342 is a button for closing the parameter specification screen 300 without performing the specification of an item or items.

In the parameter specification screen 300 as above, it is possible to specify an arbitrary number of items and item groups with respect to parameters in a given order. The order of items in a group is specified in advance, but the order of independent items or groups is adjusted appropriately by, for example, giving priority to one selected first, or the like.

Note that the candidates to be displayed on the candidate display section 310 can be registered in, for example, an assignment candidate parameter table illustrated in FIG. 7 or a parameter group table illustrated in FIG. 8.

The assignment candidate parameter table illustrated in FIG. 7 is a table in which the ID and the name of an item are registered for each of parameter items which can be assigned to user controls.

The parameter group table illustrated in FIG. 8 is a table in which the ID and the name of a group and the ID of each item included in this group are registered for each of groups of parameter items which can be assigned to user controls.

As this ID of each item, the same ID as that registered in the assignment candidate parameter table is used.

Note that as this group, one including a plurality of mutually associated items is preferably registered. For example, the Q value (Q), the band central frequency (FREQUENCY), and the gain value (GAIN) of one band of an equalizer are grouped, or the Q values of three bands LOW, MID, and HIGH are grouped.

With respect to the items in a group, the order of assignment is specified by some kind of method. It may be not only a method to prepare data specifying the order of every item, but also a method to separately define a rule such as assigning in order from the first one (on the left) of items registered in the field of belonging parameter ID.

In the example described here, for simplicity of description, which channel each parameter item is related to is not considered. In practice, it is preferable that parameter IDs are prepared separately assuming that they are different items in every channel, or the parameter item is identified by a set of a channel number and a parameter ID. It is also conceivable that the corresponding parameters for different channels are grouped. For example, gain of the LOW band on the first input channel, gain of the LOW band on the second input channel, and gain value of the LOW band on the third input channel are grouped with each other.

When the specification of a parameter item is accepted, the list becomes too long if all the parameters for all the channels are listed and displayed. Thus, it is conceivable that among the elements which identify parameter items, the specification of a channel and the specification of others (such as what part of processing in what signal processing component the parameter item specifies, or the like) are accepted separately. The specification of a channel in this case can be accepted through an arbitrary method such as direct input of a digit, selection using the selection key 222, or the like.

When several types of user controls are conceivable as the targets of assignment, such as a user knob and a user key, it is preferable that information of types of preferable user controls as the targets of assignment is given to every item and/or every group so that only preferable items for assignment to the currently specified user control can be displayed on the candidate display section 310. At this time, it is also conceivable to handle as different types not only ones for which physical shapes and operating methods are different but also ones for which only disposed sections are different.

Preferably, all the user controls provided in one section are of the same type, and it is possible to operate the user controls in the same manner regardless of which of items preferable for this section is assigned to which control. Then, selection of controls as the targets of assignment, selection of items to be assigned, and execution of the assignment are performed in every section. In the example of FIG. 3, the user knob section 260 and the user key section 270 are different sections from each other.

Next, FIG. 9 illustrates a flowchart of processing executed by the CPU 11 of the digital mixer 10 upon detection of an execution instruction for assignment of one or more parameters.

The CPU 11 of the digital mixer 10 starts the processing illustrated in the flowchart of FIG. 9 upon detection of an instruction for executing parameter assignment to a user control in a state where information of a specified user control and information of one or more specified items are retained in the processing of FIG. 4 and FIG. 5. The instruction for executing the assignment may be accepted independently, or it may be structured such that, when there is a specifying operation of an item, this operation is recognized as an instruction for executing assignment after the processing of FIG. 5 ends. Besides them, accepting through any method other than this is conceivable. Note that although not illustrated, when the execution of parameter assignment is instructed in a state where either of the information of a specified user control and the information of specified items is not retained, this is handled as an error.

In the processing of FIG. 9, the CPU 11 judges whether a plurality of items are specified or not (S31), and proceeds to step S32 to perform assignment processing related to the plurality of items when the plurality of items are specified (Yes). This judgment can be performed based on, for example, the number of parameter IDs retained.

Then the CPU 11 first determines the user controls to which the specified items are to be assigned with reference to the specified user control (S32). This determination is made according to a predetermined rule. For example, the targets of assignment are determined by the number of items to be specified in an increasing direction of ID (downward in FIG. 3) beginning from the specified control. This rule may either be always the same or selectable by the user from a plurality of candidates. Other conceivable rules are selecting the targets of assignment toward a decreasing direction of ID, and selecting so that the specified control comes to the center of the range.

Further, in the determination of step S32, basically the user controls as the targets of assignment are selected by the number of items specified (that is, the number of items to be assigned). However, when selecting by the number of items to be assigned according to the rules is not possible, a less number of items may be selected. For example, when there are four user controls and the third control is specified, only two at most can be selected in the increasing direction of ID. Accordingly, although three or more items should be assigned, only two targets of assignment can be selected.

Next, the CPU 11 determines among the specified items the items to be assigned to the user controls determined in step S32 (S33). However, the assignment itself is not performed yet in step S33. The determination in step S33 is also performed according to a predetermined rule. For example, the assignment is performed in order in the increasing direction of ID from the user control taken as the reference in step S32, according to the information of the order of specification stored in S21 of FIG. 5. This rule may either be always the same or selectable by the user from a plurality of candidates. Other conceivable rules are starting assignment not from the reference control but from the user control with the smallest ID among the controls actually selected in step S32, assigning in order in the decreasing direction of ID, and assigning in the order reverse to the information of the order of specification.

When the user controls cannot be selected by the number of items to be assigned in step S32, also the targets of assignment cannot be determined for part of the specified items in step S33. In this case, for the items for which the targets of assignment cannot be determined, no particular measure is taken and the assignment itself to controls is not performed.

Next, the CPU 11 releases the assignment of all the parameter items currently assigned to the user controls determined in step S32 and any item grouped with any one of the released items (S34). To release the assignment of an item means to return the user control to which the item is assigned to a state where no item is assigned.

Regarding this point, when the specified items are newly assigned, the user controls themselves determined in step S32 are released of course from the assignment hitherto. However, when the items are specified and assigned as a group, if the assignment of only part of them is released, it becomes difficult to comprehend the assignment state thereafter.

Thus, regarding items specified and assigned as a group, when it becomes necessary to release the assignment of part of them accompanying new assignment, the assignment of the entire group is released here.

Thereafter, the CPU 11 assigns the items determined in step S33 to the user controls determined in step S32 respectively (S35), and the processing ends.

Note that separately performing the processing of step S34 and the processing of step S35 is not essential, and release of assignment and new assignment may be combined by performing the assignment in step S35 by overwriting on the assignment hitherto.

FIG. 10 illustrates an example of a control table retaining a state of this assignment by using parameter IDs and group IDs illustrated in FIG. 7 and FIG. 8.

Illustrated in FIG. 10 is an example of a control table illustrating a state of assignment to the user knob section 260 having four user knobs with IDs of 1 to 4. On this table, as data of a state of assignment, corresponding to the IDs of the controls there are registered assigned parameter IDs which are the IDs of parameter items assigned to the controls, and assigned group IDs which are the IDs of groups to which the items belong.

The IDs of parameter items registered here are IDs registered in the assignment candidate parameter table illustrated in FIG. 7 or the parameter group table illustrated in FIG. 8. The IDs of groups are likewise IDs registered in the parameter group table illustrated in FIG. 8. Note that even the same parameter items differ in group IDs depending on which group the items are specified as. The state of assignment to the controls whose IDs are "1" and "2" are an example of this. When an item is specified as that not in a group but as an independent item, a group ID indicating this, such as "999", is registered.

In step S34, with reference to the assigned group ID in the control table of FIG. 10, it is also possible to comprehend what range of items is in the same group, and determine the range of releasing assignment.

In the processing of FIG. 9, when there is only one (No) in step S31, the CPU 11 releases assignment of the item currently assigned to the specified user control and all the items grouped with the item (S36). Thereafter, the CPU 11 assigns the specified item to the specified user control (S37), and the processing ends. The processing of these steps S36 and S37 is the same as the processing of steps S34 and S35 except that the control to which an item is to be assigned is not selected besides the specified user control.

In the above processing, the CPU 11 functions as a determining device in step S32 and an assigning device in S35.

Next, FIG. 11 illustrates a flowchart of processing executed by the CPU 11 of the digital mixer 10 upon detection of an operation of a user control.

The CPU 11 of the digital mixer 10 starts processing illustrated in the flowchart of FIG. 11 upon detection of an operation of any one of the user controls. Then, among the currently set values of parameters stored in the current memory, the CPU 11 changes the value of the item assigned to the operated user control according to the detected operation (S41), and ends the processing. What item should be changed can be comprehended based on the state of assignment of parameter items to the user control. For example, it can be comprehended with reference to the control table illustrated in FIG. 10.

Through the above-described processing, the CPU 11 can enable each user control to function as a control for operating value of the item assigned to this control among the parameters.

Next, with reference to FIG. 12, assignment performed by the processing of FIG. 9 will be described more specifically. FIG. 12 is a diagram illustrating specific examples of assignment of parameter items.

In examples of (a) to (e) illustrated in FIG. 12, STEP_A indicates a state before the processing of FIG. 9 starts. STEP_B illustrates a state after steps S32 and S33 of FIG. 9 end, STEP_C illustrates a state after step S34 ends, and STEP_D illustrates a state after step S35 ends.

FIG. 12 illustrates an example of assigning parameter items to the four user knobs of the user knob section 260, and a character such as "a" or "b" described in a control (in a knob) indicates an item assigned to this knob. Descriptions having a common alphabet at the first character, such as "a1" or "a2", indicate that these items are assigned as one group. Further, a hatched control indicates that it is a control specified as the target of assignment of an item by the user (the information of the specified user control is retained in the processing of FIG. 4). "A1", "A2", or the like indicated on the right side of a control indicates targets of assignment, determined in step S33 of FIG. 9, of each item selected as an item to be assigned to a user control.

Illustrated in (a) is an example of the case where in a state that independent (non-grouped) items are assigned to all the knobs, the top knob is specified as a target of assignment, a group of "A1" and "A2" is specified as items to be assigned, and execution of assignment is instructed. It is assumed that the rule of assignment is set such that selection of the knobs as targets of the assignment is done downward in the diagram with reference to the specified knob, and assignment of items is done by assigning the head parameter to the reference knob and assigning the items thereafter sequentially downward in the diagram.

In this case, since there are two items to be assigned, in step S32, the specified top knob and the next knob are determined as targets of the assignment. In step S33, it is further determined that "A1" and "A2" are assigned in this order to these knobs (STEP_B).

Then, the assignment of "a" and "b" to these knobs is released in step S34. Since no other item in the same group as "a" or "b" is assigned to the other knobs, it is not necessary to release the assignment of the other knobs (STEP_C).

Finally, "A1" and "A2" are assigned to the top knob and the second knob in this order in step S35, completing the assignment (STEP_D).

Next, the example of (b) is different from (a) in that, initially, grouped items "a1" to "a3" are assigned to the top three knobs (STEP_A).

In this case, in step S34, not only the assignment of the two upper knobs to which "A1" and "A2" should be assigned but also the assignment of an item to the third knob is released (STEP_C). This is because "a3" in the same group as "a1" and "a2" assigned to the top two knobs is assigned to the third knob. Regarding the fourth knob, since "d" is not in the same group as either of "a1" and "a2", the assignment thereof need not be released.

Thus, the final assignment result is a state that no item is assigned to the third knob (STEP_D).

Next, the example of (c) is different from (a) in that, initially, grouped items "b1" and "b2" are assigned to the second and third knobs from the top (STEP_A).

Also in this case, in step S34, not only the assignment of the two upper knobs to which "A1" and "A2" should be assigned but also the assignment of an item to the third knob is released (STEP_C). This is because "b2" in the same group as "b1" assigned to the second knob is assigned to the third knob.

Thus, also in the example of (c), the final assignment result is a state that no item is assigned to the third knob (STEP_D).

Next, the example of (d) is different from (c) in that the third knob from the top is specified as the target of assignment, and items "A1" to "A3" are specified in this order as items to be assigned.

In this case, since there are three items to be assigned, three knobs should be selected downward from the specified third knob in step S32. However, only two can be selected downward, and hence only the third and fourth knobs are selected as targets of the assignment. In step S33, in response to that there are only two knobs as targets of the assignment, it is determined that two items "A1" and "A2" from the top among the specified items are assigned in this order to the third and fourth knobs (STEP_B). Although "A3" is illustrated in the diagram, absence of corresponding control on the left of it indicates that there is no target of assignment.

In step S34, the assignment of items to the third and fourth knobs determined in step S32 is released. At this time, since "b1" in the same group as "b2" assigned to the third knob is assigned to the second knob, the assignment of this is also released (STEP_C).

Then, "A1" and "A2" are assigned in this order to the third knob and the lowest knob respectively in step S35, completing the assignment (STEP_D). The final assignment result is therefore a state that no item is assigned to the second knob. Further, "A3" among the items specified to be assigned is not assigned to any knob. However, this is inevitable because a knob as a target of the assignment cannot be prepared according to the user's specification. Also the user can predict this result, and hence it would not be a problem in particular.

Next, the example of (e) is of the case where in a state that independent (non-grouped) items are assigned to all the knobs, the second knob from the top is specified as a target of assignment, items "A1" to "A3" are specified as items to be assigned, and execution of assignment is instructed. It is assumed that the rule of assignment is set such that selection of the knobs as the targets of assignment is done upward in the diagram with reference to the specified knob, the last item among the items to be assigned is assigned to the reference knob, and the remaining items are assigned upward in the diagram inversely to their order, which is different from the cases of (a) to (d).

In this case, since there are three items to be assigned, in step S32 three knobs should be selected as targets of the assignment upward from the specified second knob. However, only two can be selected upward, and hence only the second and the top knobs are selected. In step S33, in response to that only two knobs could have been selected, it is determined that two "A3" and "A2" from the end among the specified items are assigned in this order to the second and top knobs (STEP_B). Although "A1" is illustrated in the diagram, the absence of the corresponding control on the left of it indicates that there is no target of assignment.

Then, the assignment of "b" and "a" to these knobs is released in step S34 (STEPS).

Finally, "A3" and "A2" are assigned in this order to the second knob and the top knob respectively in step S35, completing the assignment (STEP_D). In this case, "A1" among the items specified for assignment is not assigned to any knob. However, it is conceivable that this would not be a problem in particular, similarly to the case of (d).

As can be seen from above, in the digital mixer 10, just by specifying one control as a target of assignment, a plurality of desired parameter items specified in advance can be respectively assigned to a plurality of controls in the vicinity with reference to this control. The items assigned at this time can be selected arbitrarily by the user. Thus, even when it is attempted to assign items to a plurality of user controls, it is not necessary to perform an assignment operation separately for every one of them, and hence the operating load is small. Also it would not happen that although it is attempted to assign items to sequential controls, there is an error in operation in the middle and items are assigned by skipping some controls, or inversely that the assignment of the next item is overwritten on the control to which the previous item has been assigned.

Moreover, as illustrated in FIG. 6 and FIG. 8, the operability improves further by preparing groups of related items in advance, and allowing specification of items to be assigned in units of groups. It is conceivable that, specifically, there often occurs the case where it is desired to assign related parameter items at once to user controls, but in such a case, the user need not select items one by one from a list, and hence can instruct assignment by a simple operation. Furthermore, as compared to the case where the items are selected one by one, an error in selection hardly occurs.

Next, FIG. 13 illustrates, as other examples of assignment performed by the processing of FIG. 9, examples of assignment of parameter items to the sixteen user keys provided in the user key section 270.

In each example of (a) and (b) illustrated in FIG. 13, STEP_A illustrates a state where the information of a specified user control is retained in the processing of FIG. 4, STEP_B illustrates a state where the information of specified items and the order of the specification are retained in the processing of FIG. 5, and the rule of arrangement used for assignment is specified, and STEP_C illustrates a state where assignment is completed.

Note that the user keys provided in the user key section 270 are numbered from 1 to 16, but the positions of the keys are specified by vertical and horizontal, two-dimensional coordinates.

The rule of arrangement used when making a selection in step S32 of FIG. 9 is defined by the two-dimensional coordinates. As described in STEP_B, it is a 2×2 array in the example of (a), and in the example of (b), it is an array in which three keys are lined in each of the vertical and horizontal directions from the left top key being the origin. In both examples, the position of "A" is the reference position. That is, in step S32, while overlaying the position of "A" on the position of the key indicated by the control ID being specified, the keys at the positions corresponding to the array defined by the rule are determined as keys to which items are assigned.

Note that the rule illustrated in STEP_B includes information on what order the plurality of specified items are assigned to the determined keys. This information indicates that items should be assigned to the positions of "A", "b", "c", . . . in order from the first item. This assignment may be defined one dimensionally (information of order). It may also be defined that, when the number of specified items is larger than the number of keys specified in the rule, the reminder of the items is omitted from assignment. This is similar to (d) and (e) of FIG. 12. Inversely, when the number of specified items is smaller, the reminder of the keys is not taken as the target of assignment in step S32, or assignment "to assign no parameter item" may be performed.

By preparing the rule of arrangement as above, items can be assigned to two-dimensionally arrayed keys in the processing of FIG. 9.

In the example of (a), it is assumed that the "1" key on the left top corner is specified as a target of assignment, and four items are specified as items to be assigned to keys. In this case, according to the rule of arrangement illustrated in STEP_B, four keys of "1", "2", "5", "6" are selected in step S32 of FIG. 9 so that the position of "A" comes to the position of the "1" key. Then, the assignment of items to these keys is released, and the specified four items are newly assigned thereto.

If any item in the same group as one of the items released from assignment is assigned to another key, the assignment of this item is also released of course.

In the example of (b), it is assumed that the key "10" at the third from left and the second from top is specified as a target of assignment, and five items to be assigned to keys are specified. Then, in step S32 of FIG. 9, according to the rule of arrangement illustrated in STEP_B, the five keys corresponding to "A" to "e" are selected so that the position of "A" comes to the position of the "10" key. However, the key corresponding to "c" comes out of the arrangement area of the user keys, and hence cannot be selected. This is similar to (d) and (e) of FIG. 12.

In this case, among the five specified items, the third item which should be assigned to the key corresponding to "c" cannot be assigned to a user key.

However, regarding the four other keys "10", "11", "12", "14", the assignment of items to these keys is released, and the first, fourth, fifth, second items among the five specified items are newly assigned (this order results from complying with the rule of arrangement).

As described above, also when user controls are arrayed two dimensionally, just by specifying one control as a target of assignment, a rule of two-dimensional arrangement is applied, and a plurality of desired parameter items specified in advance can be assigned to a plurality of controls, respectively, in the vicinity with reference to this control.

Note that it is of course possible to apply a rule of arrangement similar to the case of user knobs illustrated in FIG. 12 by assuming that the arrangement of user keys as illustrated in FIG. 13 is one-dimensional arrangement from "1" to "16".

Description of the embodiment has thus been finished. However, the structure of the apparatus, the structure of the operating panel, the arrangement of the controls, the specific procedures of processing, the contents of display on the screen, the operating method, the rules of arrangement, and so on are of course not limited to those explained in the above-described embodiment.

For example, it may be structured such that two or more items specified by the user can be grouped arbitrarily in the screen illustrated in FIG. 6, or the like. In this case, registering the arbitrarily grouped items in the parameter group table illustrated in FIG. 8 enables to specify these items at once as a group from the next time. Also when assignment in step S34 of FIG. 9 is released, the items can be assumed to be in the same group. Note that the number of items included in one group is not particularly limited.

Alternatively, it may be structured such that when the processing of FIG. 9 is performed, if a plurality of items or a plurality of groups are specified, the processing of step S34 is performed by assuming the whole of these items or groups as one group while they are being assigned to user controls, without registering them as a group in the parameter group table. In this case, the group may be assigned a temporary group ID and may be registered in the control table illustrated in FIG. 10.

In the examples illustrated in FIG. 7 and FIG. 8, a parameter ID is given to a parameter item, and a group ID is given to an item group. However, they may be IDs treated in the same way without distinguishing them in format.

An example of this is illustrated in FIG. 14. In this case, an independent item and an item group can be specified in exactly the same way. Note that in this case what items are included in a group is managed separately. In such cases, it may further be structured to distinguish by a particular digit whether the relevant ID indicates an independent item or an item group. In the example of FIG. 14, the most significant digit of the ID of an independent item is "0", and the most significant digit of the ID of a group is "1".

Besides the above-described method using IDs, the user controls and parameter items specified by the user can be retained and managed by any method. The use of ID itself is not essential.

Regarding the rule of arrangement of items, it may be structured such that the same rule is applied to all assignments, or a plurality of rules is prepared in advance for allowing the user to arbitrarily select and apply one when performing assignment. Alternatively, it may be structured such that item groups and rules are associated in advance, and when an item in a certain group is assigned to a user control, if there is a rule corresponding to this group, this rule is used automatically.

When an array of user controls is handled two-dimensionally, if the number of controls as targets of assignment prepared in the rule of arrangement and the number of items to be arranged differ largely, the arrangement result becomes unnatural. However, it is conceivable that this can be prevented by associating groups and rules suitable for the groups in advance.

Rules of arrangement themselves are not limited to those of the above-described embodiment, and may be any rule as long as it defines an algorithm of selecting a plurality of user controls to be targets of arrangement of a plurality of items with reference to a control specified by the user, and an algorithm for assigning items thereto. It need not be a rule in which a control or item to be reference comes to an end. It may be structured to allow the user to create new rule of arrangement.

Arrangement of user controls is not limited to a vertical array or a matrix, and may be any array such as a horizontal array or a circular array. The user control is not limited to a rotary encoder or a push button, and may be of any shape or any operating method.

The invention is not limited to a digital mixer, and is applicable of course to any audio signal processing apparatus such as an electronic musical instrument, a synthesizer, a tone generator, an amplifier device, a recorder, an effector, or the like. Besides them, the invention is also applicable to any controller having a function of editing values of a plurality of parameters.

Further the controller itself is not required to perform some kind of processing using the edited value of the parameters. For example, this invention is applicable to a physical controller for operating a DAW (digital audio workstation) application executed by a PC (personal computer).

The physical controller requests a DAW application executed on a PC to change, according to operation of a control provided in its operating panel, value of a parameter managed by the DAW application, thereby enabling the control to function as a control for changing value of the parameter managed by the DAW application. However, the physical controller itself does not perform audio signal processing according to this set value of the parameter.

However, also in this case, in this physical controller, a parameter item of the DAW application can be assigned to a control by a method similar to that of the above-described embodiment, to thereby enable the control to function as a control for operating the value of the assigned item.

In this case, it is not essential for the physical controller itself as a controller to store values of the parameters as targets of editing.

Thus, it can be said that the invention is applicable to any electronic apparatus for controlling values of a plurality of parameter items by using physical controls or controls on a GUI, or to a remote controller thereof.

Further, a program of this invention can be configured as a program including instructions for enabling a computer to function as the above-described control apparatus. Such a program can be stored in advance in a memory of a computer, or can be recorded in a machine readable non-transitory medium such as a CD-ROM or a flexible disk, a non-volatile recording medium (memory) such as an SRAM, EEPROM, or memory card, or can be provided by allowing downloading via a network. The above-described functions can be realized by installing this program and making a CPU execute this program, or by making a CPU obtain this program from a storage medium or a download server and execute this program.

The structures and modification examples which have been described above can be combined appropriately and applied within a non-contradictory range.

INDUSTRIAL APPLICABILITY

As is clear from the above description, the control apparatus and the program of the invention enables assigning, by simple operation with a high degree of freedom, a plurality of controls parameter items to be operated with the controls.

Applying the invention can therefore improve the operability of a control apparatus.

REFERENCE SIGNS LIST

10 . . . digital mixer, 11 . . . CPU, 12 . . . flash memory, 13 . . . RAM, 14 . . . external device I/O, 15 . . . display, 16 . . . moving fader, 17 . . . other controls, 18 . . . waveform I/O, 19 . . . DSP, 20 . . . system bus, 101 . . . analog input section, 102 . . . digital input section, 110 . . . input patch, 120 . . . input channel section, 130 . . . bus section, 140 . . . output channel section, 150 . . . output patch, 161 . . . analog output patch, 162 . . . digital output section, 200 . . . operating panel, 210 . . . first channel strip section, 220 . . . channel strip, 230 . . . touch panel, 240 . . . second channel strip section, 250 . . . third channel strip section, 260 . . . user knob section, 270 . . . user key section, 280 . . . other-control section, 300 . . . parameter specification screen, 310 . . . candidate display section, 320 . . . specified parameter display section, 331 . . . specify button, 332 . . . release button, 341 . . . OK button, 342 . . . cancel button

The invention claimed is:

1. An audio signal processing apparatus comprising:
a plurality of controls;
a first accepting device that accepts a specification of a single control of the plurality of controls;
a second accepting device that accepts a specification of a plurality of parameter items;
a determining device that determines multiple controls, which form a part of the plurality of controls, as targets of assignment to which the specified plurality of parameter items are to be assigned, the targets of assignment being in vicinity of the single specified control;
an assigning device that assigns each of the specified plurality of parameter items to a respective one control of the multiple controls determined by the determining device at once, in response to a single assignment execution instruction; and
a device that controls each of the plurality of controls to function as a control for controlling value of a parameter item assigned to the control according to the assignment by the assigning device,
wherein the determining device determines the multiple controls as the targets of assignment to which the specified plurality of parameter items are to be assigned according to a predetermined rule of arrangement, wherein the predetermined rule of arrangement defines:
an algorithm of selecting the multiple controls to be determined by the determining device, the multiple controls selected to be targets of arrangement of the specified plurality of parameter items in vicinity of the single specified control and
an algorithm for assigning the specified plurality of parameter items to the selected multiple controls.

2. The audio signal processing apparatus of claim 1, wherein the second accepting device accepts the specification of the plurality of parameter items as a group-based specification of a predetermined group including the plurality of parameter items.

3. The audio signal processing apparatus of claim 1, wherein the multiple controls determined by the determining device include the single specified control and one or more other controls of the plurality of controls, the single specified control and the one or more other controls arranged in an array or a matrix on an operating panel.

4. A non-transitory machine-readable medium containing program instructions executable by a computer and enabling the computer to function as:
a first accepting device that accepts specification of a single control of a plurality of controls;
a second accepting device that accepts a specification of a plurality of parameter items;
a determining device that determines multiple controls, which form a part of the plurality of controls, as targets of assignment to which the specified plurality of parameter items are to be assigned, the targets of assignment being in vicinity of the single specified control;
an assigning device that assigns each of the specified plurality of parameter items to a respective one control of the multiple controls determined by the determining device at once, in response to a single assignment execution instruction; and
a device that controls each of the plurality of controls to function as a control for controlling value of a parameter item assigned to the control according to the assignment by the assigning device, wherein the determining device determines the multiple controls as the targets of assignment to which the specified plurality of parameter items are to be assigned according to a predetermined rule of arrangement, wherein the predetermined rule of arrangement defines:

an algorithm of selecting the multiple controls to be determined by the determining device, the multiple controls selected to be targets of arrangement of the specified plurality of parameter items in vicinity of the single specified control and an algorithm for assigning the specified plurality of parameter items to the selected multiple controls.

5. The non-transitory machine-readable medium of claim 4, wherein the second accepting device accepts the specification of the plurality of parameter items as a group-based specification of a predetermined group including the plurality of parameter items.

6. The non-transitory machine-readable medium of claim 4, wherein the multiple controls determined by the determining device include the single specified control and one or more other controls of the plurality of controls, the single specified control and the one or more other controls arranged in an array or a matrix on an operating panel.

7. A method comprising:

accepting a specification of a single control of a plurality of controls;

accepting a specification of a plurality of parameter items;

determining multiple controls, which form a part of the plurality of controls, as targets of assignment to which the specified plurality of parameter items are to be assigned, the targets of assignment being in vicinity of the single specified control;

assigning each of the specified plurality of parameter items to a respective one control of the determined multiple controls at once, in response to a single assignment execution instruction; and controlling each of the plurality of controls to function as a control for controlling value of a parameter item assigned to the control according to the assignment, wherein determining the multiple controls is determining the multiple controls as the targets of assignment to which the specified plurality of parameter items are to be assigned according to a predetermined rule of arrangement, wherein the predetermined rule of arrangement defines:

an algorithm of selecting the multiple controls to be determined, the multiple controls selected to be targets of arrangement of the specified plurality of parameter items in vicinity of the single specified control and an algorithm for assigning the specified plurality of parameter items to the selected multiple controls.

8. The method of claim 7, wherein accepting the specification of the plurality of parameter items is accepting a group-based specification of a predetermined group including the plurality of parameter items.

9. The method of claim 7, wherein the determined multiple controls include the single specified control and one or more other controls of the plurality of controls, the single specified control and the one or more other controls arranged in an array or a matrix on an operating panel.

* * * * *